United States Patent
Yoon et al.

(10) Patent No.: US 11,177,683 B2
(45) Date of Patent: Nov. 16, 2021

(54) OVERVOLTAGE PROTECTION SYSTEM USING BALANCING RESISTOR

(71) Applicant: LG CHEM, LTD., Seoul (KR)

(72) Inventors: Seung Kyu Yoon, Daejeon (KR); Tae Hoon Kim, Pyeongtaek-Si (KR)

(73) Assignee: LG CHEM, LTD., Seoul (KR)

( * ) Notice: Subject to any disclaimer, the term of this patent is extended or adjusted under 35 U.S.C. 154(b) by 117 days.

(21) Appl. No.: 16/603,004

(22) PCT Filed: Feb. 23, 2018

(86) PCT No.: PCT/KR2018/002268
§ 371 (c)(1),
(2) Date: Oct. 4, 2019

(87) PCT Pub. No.: WO2018/230813
PCT Pub. Date: Dec. 20, 2018

(65) Prior Publication Data
US 2020/0036219 A1    Jan. 30, 2020

(30) Foreign Application Priority Data
Jun. 13, 2017   (KR) .................. 10-2017-0074083

(51) Int. Cl.
*H02J 7/24*   (2006.01)
*H02J 7/00*   (2006.01)

(52) U.S. Cl.
CPC ............ *H02J 7/243* (2020.01); *H02J 7/0016* (2013.01); *H02J 7/0026* (2013.01); *H02J 7/00711* (2020.01)

(58) Field of Classification Search
None
See application file for complete search history.

(56) References Cited

U.S. PATENT DOCUMENTS

| | | |
|---|---|---|
| 2005/0083797 A1 | 4/2005 | Shigeeda et al. |
| 2010/0237829 A1 | 9/2010 | Tatebayashi et al. |
| 2011/0248677 A1 | 10/2011 | Shimizu |
| 2013/0057224 A1 | 3/2013 | Choi et al. |
| 2014/0347013 A1* | 11/2014 | Kim ............... G01R 31/382 320/134 |
| 2016/0336624 A1 | 11/2016 | Gu et al. |

FOREIGN PATENT DOCUMENTS

| | | |
|---|---|---|
| JP | 2000-323175 A | 11/2000 |
| JP | 2008-278688 A | 11/2008 |
| JP | 2009-131020 A | 6/2009 |
| JP | 2009-254008 A | 10/2009 |
| JP | 2010-178496 A | 8/2010 |
| JP | 5051264 B2 | 10/2012 |

(Continued)

OTHER PUBLICATIONS

International Search Report for PCT/KR2018/002268 (PCT/ISA/210) dated Jun. 25, 2018, with English translation.

(Continued)

*Primary Examiner* — Robert Grant
(74) *Attorney, Agent, or Firm* — Birch, Stewart, Kolasch & Birch, LLP

(57) ABSTRACT

The present invention relates to a system and method for preventing overvoltage of a battery using a cell balancing circuit.

6 Claims, 3 Drawing Sheets

(56) References Cited

FOREIGN PATENT DOCUMENTS

| JP | 2014-230488 A | 12/2014 |
|----|---------------|---------|
| KR | 10-2005-0026360 A | 3/2005 |
| KR | 10-2009-0072281 A | 7/2009 |
| KR | 10-2012-0131844 A | 12/2012 |
| KR | 10-2016-0008106 A | 1/2016 |
| KR | 10-2016-0049300 A | 5/2016 |
| KR | 10-2016-0097637 A | 8/2016 |
| KR | 10-2016-0134120 A | 11/2016 |
| KR | 10-2016-0144762 A | 12/2016 |

OTHER PUBLICATIONS

Extended European Search Report for European Application No. 18818880.9, dated Feb. 11, 2020.

\* cited by examiner

OVERVOLTAGE PROTECTION SYSTEM USING BALANCING RESISTOR

TECHNICAL FIELD

The present invention relates to a system for preventing battery overvoltage, and more particularly, to a system for preventing battery overvoltage using an existing balancing circuit.

BACKGROUND ART

Typically, a secondary cell applied/mounted to a device such as a mobile electronic device or an electric vehicle, which requires a rechargeable electrical storage device, is configured from multiple cells connected in series or in parallel.

In a process for charging the secondary cell including such multiple cells, when even any one cell among the multiple cells is charged with a voltage equal to or greater than a certain voltage, a dangerous problem such explosion or ignition may arise. Such cell overcharge is typically a cause of cell overvoltage and affects other cells except the overvoltage cell, and thus results in a problem such as performance degradation or occurrence of failure. Accordingly, cell overvoltage is a cause of high risk inducing various problems, and thus prevention of such problems is important for a safety, performance, and the like of a secondary cell.

In order to resolve such a problem, a scheme for cutting off an inflow of a charge current, which is a main cause of the overvoltage, has been used for preventing a cell from being overcharged. In detail, when voltages of cells are measured through a battery monitoring IC, a Micro Controller Unit (MCU) compares a cell voltage value measured by the battery monitoring IC with a constant reference voltage value to determine whether each cell is overcharged. When at least one cell among the multiple cells is determined to be overvoltage, the MCU controls such that a path through which a charge current flows to the secondary cell (battery) is cut off and prevents occurrence of a dangerous problem caused by the overvoltage.

However, when cell overvoltage is prevented only using the existing scheme described above, a condition in which a problem occurrence caused by cell overcharge is not prevented may arise by various reasons such as, for example, a case where overvoltage is misjudged due to malfunction of an MCU, a case where a path through which a charge current flows to a secondary cell, namely, a battery, is not normally cut off, or a case where overcharge is not caused by a charge current to a secondary cell.

DISCLOSURE OF THE INVENTION

Technical Problem

The present invention has a purpose of resolving a problem arising from prevention of overvoltage occurrence in a secondary cell only using an existing scheme.

Technical Solution

A system for preventing overvoltage of a battery, in which one or more cells are provided according to an embodiment of the present invention, includes: a voltage measurement unit configured to measure a voltage of each cell; a first control unit configured to output a cutoff signal for cutting an inflow of a charge current, when a first measurement voltage value of at least one cell of the one or more cells measured by the voltage measurement unit is equal to or greater than a prescribed first reference voltage value; a cutoff unit configured to receive the cutoff signal from the first control unit to cut off the inflow of the charge current; a cell balancing unit configured to compare a voltage difference between each of the cells to perform cell balancing; and a second control unit configured to compare a second measurement voltage value of the at least one cell measured by the voltage measurement unit with a prescribed second reference voltage value to control the cell balancing unit on a basis of a comparison result.

The cell balancing unit may comprise: a balancing Field Effect Transistor (FET) configured to be on/off-controlled according to a control from the second control unit; and a balancing resistor in which a cell current is discharged by the balancing FET being turned on.

On the other hand, the second control unit may comprise: a voltage comparison unit configured to compare the second measurement voltage value measured by the voltage measurement unit with a prescribed second reference voltage value; and an overvoltage determination unit configured to output a turn-on signal to the balancing FET, when the second measurement voltage value is equal to or greater than the prescribed second reference voltage value according to a comparison result of the voltage comparison unit.

At this point, the balancing FET may be configured to discharge discharging a corresponding voltage of the second measurement voltage value of the at least one cell and the balancing resistor is characterized by consuming the discharged voltage.

Here, the second reference voltage value may be greater than the first reference voltage value.

A method for preventing overvoltage of a battery, in which one or more cells are provided, includes: a first voltage measurement step for measuring a voltage of each cell; a first overvoltage determination step for comparing a first measurement voltage value of at least one cell of the one or more cells measured in the first voltage measurement step with a prescribed first reference voltage to determine whether the cell is overvoltage; a cutoff signal output step for outputting a cutoff signal for cutting off an inflow of a charge current, when the at least one cell is determined to be in overvoltage in the first overvoltage determination step; a second voltage measurement step for measuring a voltage of the at least one cell which has been determined to be in overvoltage in the first overvoltage determination step; a second overvoltage determination step for comparing a second measurement voltage value of at least one cell measured in the second voltage measurement step with a prescribed second reference voltage value to determine whether the cell is in overvoltage; a balancing FET turn-on signal output step for outputting a turn-on signal to the balancing FET, when the at least one cell is determined to be in overvoltage in the second overvoltage determination step; and an overvoltage discharge step in which a voltage of the at least one cell is discharged, the at least one cell having been determined to be in overvoltage in the second overvoltage determination step.

At this point, in the overvoltage discharge step, the voltage of the at least one cell may be discharged in a balancing resistor through the balancing FET.

Here, the second reference voltage value may be greater than the first reference voltage value.

Advantageous Effects

The present invention may prevent a problem occurrence caused by overvoltage in a secondary cell with enhanced accuracy and stability by configuring such that overvoltage is first prevented using a scheme that has been typically used, and then the overvoltage is prevented using a cell balancing circuit implemented previously.

MODE FOR CARRYING OUT THE INVENTION

Figure 1:
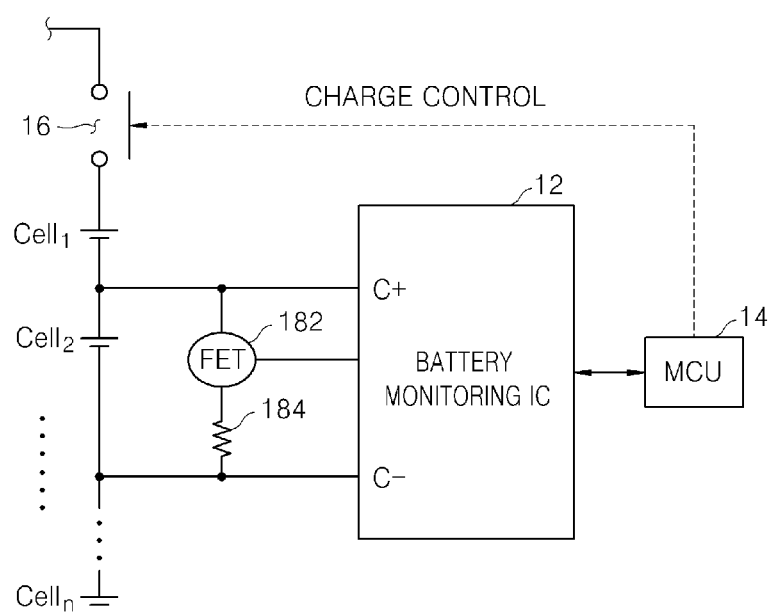
FIG. 1 illustrates a typical overvoltage protection system.

Hereinafter, embodiments of the present invention will be described in detail with reference to the accompanying drawings so that the present invention can be easily realized by those skilled in the art. The present invention can be practiced in various ways and is not limited to the embodiments described herein. In the drawings, parts which are not related to the description are omitted to clearly set forth the present invention and similar elements are denoted by similar reference symbols throughout the specification.

It will be understood that, although the terms first, second, etc. may be used herein to describe various elements, these elements should not be limited by these terms. The terms are used only for the purpose of distinguishing one component from another component. For example, a first element could be termed a second element, and, similarly, a second element could be termed a first element, without departing from the scope of example embodiments. Terms used herein are provided for merely explaining specific embodiments of the present invention, not limiting the invention. The singular forms "a," "an" and "the" are intended to include the plural forms as well, unless the context clearly indicates otherwise.

In addition, if certain parts are described as being "connected" to other parts, they are not only "directly connected" to the other parts, but also "indirectly connected" to the other parts with any other device intervened therebetween. In addition, when an element is referred to as "comprising" or "including" a component, it does not preclude another component but may further include the other component unless the context clearly indicates otherwise. Through the whole document of the present invention, the term "step of" does not mean "step for".

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant. In this case, the meanings of the arbitrarily selected terminologies shall be defined in the relevant part of the detailed description. Accordingly, the specific terms used herein should be understood based on the unique meanings thereof and the whole context of the present invention.

Hereinafter, embodiments of the present invention will be described in detail with reference to the accompanying drawings.

FIG. 1 illustrates a typical overvoltage protection system.

When describing an overvoltage prevention operation for a secondary cell in relation to FIG. 1, the overvoltage prevention circuit for a battery including at least one or more battery cells Cell 1 to n largely includes a battery monitoring IC 12, an MCU 14, a current inflow path 16, and a balancing circuit 18 formed of a balancing Field Effect Transistor (FET) 182 and a balancing resistor 184.

When describing a typical scheme for preventing overvoltage of a battery cell, first, each voltage of battery cells is measured by the battery monitoring IC 12. After measurement of the voltage of each battery cell, the measured voltage value of each battery cell (hereinafter, measurement voltage value) is delivered to the MCU 14. The MCU 14, which has received a measurement voltage value of each battery cell, determines whether the battery cell is overvoltage or not through comparison with a preset reference voltage value.

As a comparison result, when the measurement voltage value of at least one cell among the measurement voltage values of the battery cells is equal to or greater than the preset reference voltage value, the MCU 14 determines that the overvoltage occurs in the corresponding battery, outputs a signal for cutting off a path through which a charge current flows to the battery cells in order to cut off a further inflow of the charge current, namely, to prevent overcharge, and controls the current inflow path 16 as shown in FIG. 1. Even though being illustrated as a path type in the drawing, the current inflow path 16 may be configured from, for example, a switch or a FET, etc., which is capable of cutting off the inflow of the charge current by a control of the MCU 14.

In other words, it is a typical scheme in which a dangerous cause due to overvoltage is prevented from being generated by cutting off the inflow of the charge current to the battery cells, when it is confirmed that there is a cell determined to be overvoltage.

However, when only a typical scheme like FIG. 1 is used, for example, when an overvoltage state is misjudged by malfunction of the MCU 14, which determines whether a cell is overvoltage or not only using a measurement voltage value of the cell, there is a limitation such that a problem occurrence caused by overvoltage is not prevented according to various reasons including a case where the current inflow path 16 is not normally cut off, although the MCU 14 outputs a cutoff signal for cutting off the inflow of the charge current, or a case where overvoltage is not caused by overcharge, in contrast with a typical case where overvoltage is mainly caused by overcharge.

Accordingly, the present invention additionally provides a circuit for preventing overvoltage to enhance stability of prevention of overvoltage occurrence in a battery.

Figure 2:
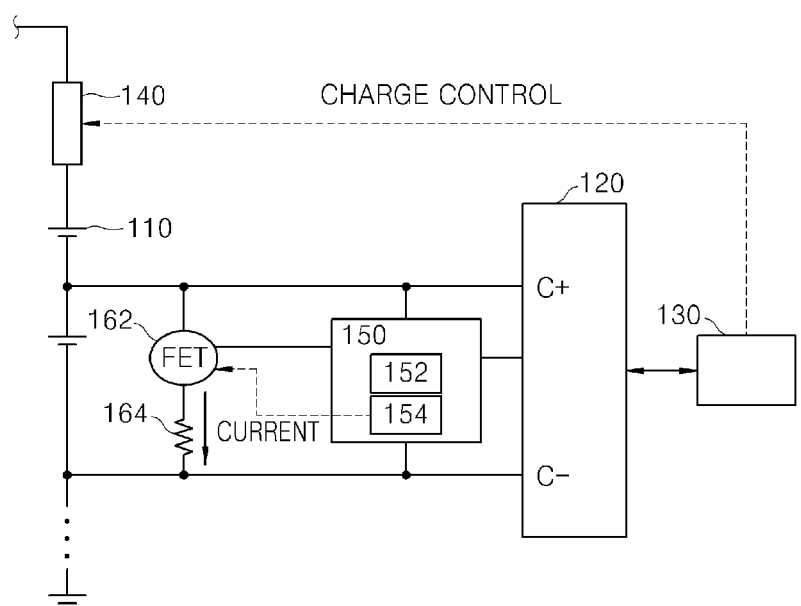
FIG. 2 illustrates an overvoltage protection system according to an embodiment of the present invention.

A detailed description will be provided with reference to FIG. 2 in which an overcharge protection system according to an embodiment of the present invention is schematically illustrated.

In relation to FIG. 2, the overcharge protection system according to an embodiment of the present invention includes a plurality of battery cells Cell 1 to n, 110, a voltage measurement unit 150, a first control unit 130, a cutoff unit 140, a second control unit 150, and a cell balancing unit 160.

The voltage measurement unit 120 may measure a voltage of each battery cell to calculate a measured voltage value of each cell. The voltage measurement unit 120 performs monitoring by measuring a voltage of each cell in a preset constant period interval, and here, a descriptions will be provided by referring to a voltage value measured in a current period N as a first measurement voltage value, and a voltage value measured in a next period (N+1) after the current period N as a second measurement voltage value.

The voltage measurement unit 120 may deliver the first measurement voltage value to the first control unit 130, and the second measurement voltage value to the second control unit 150.

Here, the voltage measurement unit 120 may be the same component for performing the same function as that of the typical battery monitoring IC 12 shown in FIG. 1.

The first control unit 130 may compare the first measurement voltage value of each cell delivered from the voltage measurement unit 120 with a prescribed first reference voltage value, which is a reference for determining occurrence of the overvoltage. When the first measurement voltage value of at least one cell among the battery cells is equal to or greater than the prescribed first reference voltage value, it may be determined that overvoltage occurs in the corresponding cell. As described above, when the first measurement voltage value of the at least one cell is determined to be overvoltage, a cutoff signal for cutting off a further inflow of a charge current to the battery cells may be generated to be output to the cutoff unit 140.

Here, the first control unit 130 may be the same component for performing the same function as that of the typical MCU 14 shown in FIG. 1.

For reference, as described above, the voltage measurement unit 120 and the first control unit 130 are respectively the same components as the battery monitoring IC 12 and the MCU 14 formed in the typical overvoltage protection circuit, and thus may control the cell balancing unit 160, namely, the cell balancing operation as in the typical scheme.

The cutoff unit 140 may cut off the inflow of the charge current to the battery cells, when receiving the cutoff signal from the first control unit 130. Accordingly, the path through which the charge current flows to the battery cells is cut off and thus the current may be cut off from charging the battery cells.

The cutoff unit 140 may be formed of, for example, a switch or FET, etc., and accordingly the cutoff signal may mean a signal for controlling on/off of the cutoff unit 140.

In addition, the cutoff unit 140 may be the same component as the current inflow path 16 shown in FIG. 1.

On the other hand, the second control unit 150 may include a voltage comparison unit 152 and an overvoltage determination unit 154.

The voltage comparison unit 152 may compare the second measurement voltage value measured by the voltage measurement unit 120 with a prescribed second reference voltage value.

The overvoltage determination unit 154 may determine that the overvoltage continuously occurs, when as a comparison result from the voltage comparison unit 152, the second measurement voltage value is equal to or greater than the prescribed second reference voltage value. In this case, the overvoltage determination unit 154 may output a turn-on signal to a balancing FET 162 of the cell balancing unit 160, which will be described later.

In other words, when the second measurement voltage value is equal to or greater than the prescribed second reference voltage value, it may be determined that overvoltage prevention is not normally performed by the first control unit 130 or the overvoltage is not caused by overcharge.

Here, when describing on the basis of a time at which the second measurement voltage value is measured, a time at which the first measurement voltage value becomes a previous period N. In other words, the second measurement voltage value may mean a value calculated by measuring again, in a current period (N+1), a voltage of a cell having been determined to be overcharge from among the first measurement voltage values having been measured in the previous period N.

In other words, for the corresponding cell which has been determined to be overvoltage from among the first measurement voltage values having been measured in the previous period N, an inflow of the charge current thereto is cut off according to a control of the first control unit 130 to primarily prevent a dangerous cause of the overvoltage. Then, a voltage of the corresponding cell, which has been determined to be overcharge from among the first measurement voltage values, is measured again in the current period (N+1), and it is determined whether a dangerous cause of the overvoltage has been normally prevented. When a second measurement voltage value is also determined to be overvoltage, the dangerous cause of the overvoltage is to be correspondingly prevented secondarily.

The cell balancing unit 160 may include a balancing FET 162 of which on/off is controlled according to a control of the second control unit 150, and a balancing resistor 164 in which a cell current flowing through the turned-on balancing FET 162 is discharged.

The balancing FET 162 may be turned on according to a turn-on signal output from the overvoltage determination unit 154 of the second control unit 150. Accordingly, as the balancing FET 162 is turned on, a current to the cell which corresponds to the second measurement voltage value that has been determined to be overvoltage by the overvoltage determination unit 154 may be allowed to flow through the balancing resistor 164.

The balancing resistor 164 may be a component in which the cell current is discharged, the cell current flowing according to the turn-on of the balancing FET 162. In other words, the balancing FET 162 discharges the voltage corresponding to the second measurement voltage value, which has been determined to be overvoltage, and the balancing resistor 164 consumes the discharged voltage, and accordingly, the dangerous cause due to the overvoltage may be prevented.

Here, the second control unit 150 may be a component for secondarily preventing overvoltage, when the overvoltage is not normally prevented in the first control unit 130.

Accordingly, the second reference voltage value, which is a reference for determining whether the cell is overvoltage by the overvoltage determination unit 154 of the second control unit 150, may be preferably set to be a value larger than the first reference voltage value that is a reference for determining whether the cell is overvoltage by the first control unit 130.

Figure 3:
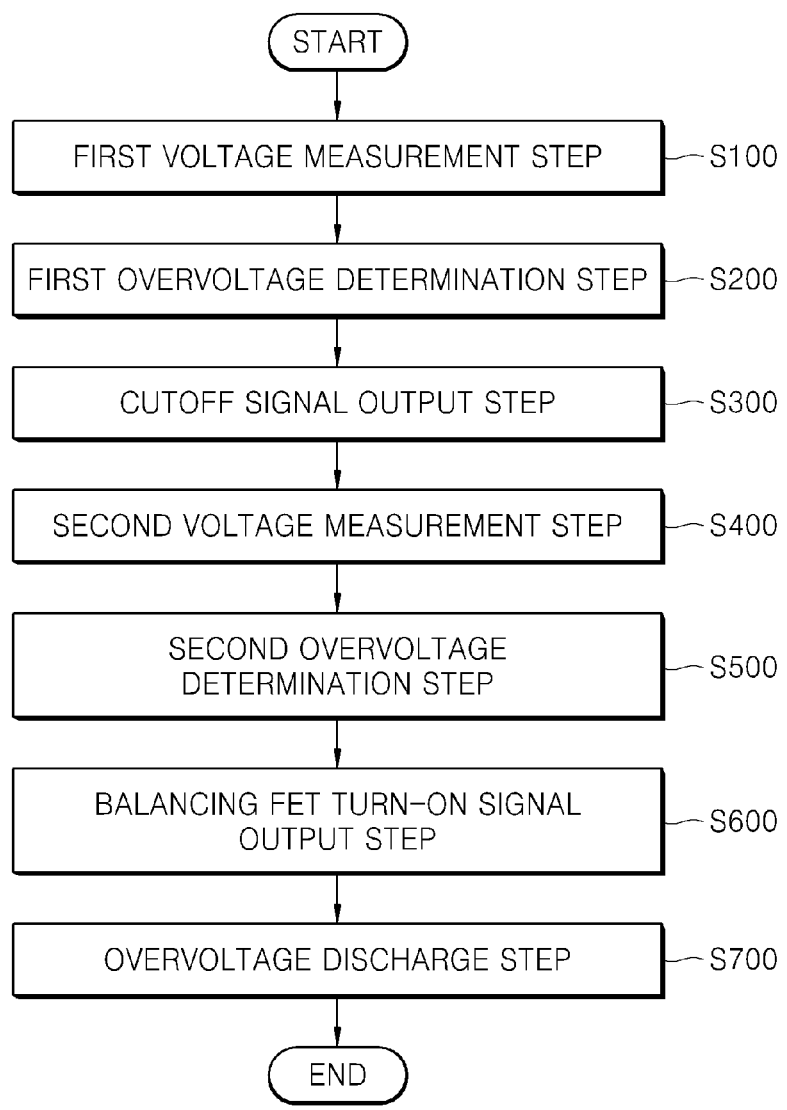
FIG. 3 is a block diagram of an overvoltage prevention method according to an embodiment of the present invention.

FIG. 3 is a block diagram which represents a method for preventing overvoltage of a battery using the overvoltage prevention system according to the above-described embodiment of the present invention.

In relation to FIG. 3, the method for preventing overvoltage according to an embodiment of the present invention includes a first voltage measurement step S100, a first overvoltage determination step S200, a cutoff signal output step S300, a second voltage measurement step S400 a second overvoltage determination step S500, a balancing FET turn-on signal output step S600, and an overvoltage discharge step S700.

The first voltage measurement step S100 is a step for measuring each voltage of a plurality of battery cells. The voltage of each battery cell is measured to calculate a voltage value of each cell. At this point, the calculated voltage value of each cell will be referred to as a first measurement voltage value and a description thereabout will be provided.

The first voltage measurement step S100 may be a step performed by the voltage measurement unit 120. As described above in relation to FIG. 2, the voltage measurement of each cell may be performed in a preset constant period interval.

In other words, the first measurement voltage value calculated by the first voltage measurement step S100 means a voltage value measured in a current period N.

The first overvoltage determination step S200 may be a step for comparing the first measurement voltage value of each cell measured in the first voltage measurement step S100 with a prescribed first reference voltage value to determine whether the cell is overvoltage through a comparison result. As the comparison result, when the first measurement voltage value is equal to or greater than the prescribed first reference voltage value, the corresponding cell is determined to be overvoltage.

The first overvoltage determination step S200 may be performed by the first control unit 130 as described above with reference to FIG. 2.

The cutoff signal output step S300 may be a step for outputting a cutoff signal for cutting off a path through which a current is charged in order to cut off an inflow of a charge current to the battery cells. According to the output of the cutoff signal, the path through which the charge current flows to the battery cells, namely, the inflow of the charge current may be cut off by the cutoff unit 140 as described with reference to FIG. 2. Accordingly, the current being charged to the battery cells may be cut off.

The second voltage measurement step S400 may be a step for measuring a voltage of at least one or more cells having been determined to be overvoltage in the first overvoltage determination step S200.

Like the first voltage measurement step S100, the second voltage measurement step S400 may also be performed by the voltage measurement unit 120.

In other words, when describing on the basis of a time when the second voltage measurement step S400 is performed, the second voltage measurement step S400 is a step for measuring again the voltage of at least one or more cells having been determined to be overvoltage from among the first measurement voltages having been measured in a previous period N, and a voltage value calculated at this point is referred to as a second measurement voltage value.

The second overvoltage determination step S500 may be a step for comparing the second measurement voltage value of the at least one or more cells, which is measured in the second voltage measurement step S400, with a prescribed second reference voltage value to determine whether the cell is overvoltage through a comparison result.

When the second measurement voltage value is equal to or greater than a prescribed second reference voltage value, this means that the overvoltage prevention process having been performed through steps S100 to S300 is not normally performed or the overvoltage continuously occurs in at least one or more cells which correspond to the first measurement voltage value and in which the overvoltage occurrence is not caused by overcharge.

Accordingly, in order to reduce the voltage of the at least one or more cells that are determined to be overvoltage, the balancing FET may be controlled to be turned on through the balancing FET turn-on output step S600.

As described with reference to FIG. 2, this process may be performed by the overvoltage determination unit 154. As a turn-on signal is output to the balancing FET 162, a current of at least one or more cells corresponding to the second measurement voltage value that is determined to be overvoltage may flow to the balancing resistor 164. Accordingly, a dangerous cause due to the overvoltage may be prevented by performing the overvoltage discharge step S700 in which the overvoltage is discharged, namely, overvoltage energy is discharged in the balancing resistor 164, and then the voltage is reduced.

The present invention has been described using preferred embodiments. However, it is to be understood that the scope of the present invention is not limited to the disclosed embodiments. In addition, it should be understood that all changes or modifications derived from the definitions and scopes of the Claims and their equivalents fall within the scope of the present invention.

What is claimed is:

1. A system for preventing overvoltage of a battery in which one or more cells are provided, the system comprising:
    a voltage measurement unit configured to measure a voltage of each cell;
    a first control unit configured to output a cutoff signal for cutting an inflow of a charge current, when a first measurement voltage value of at least one cell of the one or more cells measured by the voltage measurement unit is equal to or greater than a prescribed first reference voltage value;
    a cutoff unit configured to receive the cutoff signal from the first control unit to cut off the inflow of the charge current;
    a cell balancing unit configured to compare a voltage difference between each of the cells to perform cell balancing; and
    a second control unit configured to compare a second measurement voltage value of the at least one cell measured by the voltage measurement unit with a prescribed second reference voltage value to control the cell balancing unit on a basis of a comparison result,
    wherein the second control unit comprises:
    a voltage comparison unit configured to compare the second measurement voltage value measured by the voltage measurement unit with a prescribed second reference voltage value; and
    an overvoltage determination unit configured to output a turn-on signal to a balancing Field Effect Transistor (FET), when the second measurement voltage value is equal to or greater than the prescribed second reference voltage value according to a comparison result of the voltage comparison unit, and
    wherein the second reference voltage value is greater than the first reference voltage value.

2. The system of claim 1, wherein the cell balancing unit comprises:
    the balancing FET, the balancing FET configured to be on/off-controlled according to a control from the second control unit; and
    a balancing resistor in which a cell current is discharged by the balancing FET being turned on.

3. The system of claim 2, wherein the balancing FET is configured to discharge a corresponding voltage of the second measurement voltage value of the at least one cell and the balancing resistor is configured to consume the discharged voltage.

4. A method for preventing overvoltage of a battery in which one or more cells are provided, the method comprising:

a first voltage measurement step for measuring a voltage of each cell;

a first overvoltage determination step for comparing a first measurement voltage value of at least one cell of the one or more cells measured in the first voltage measurement step with a prescribed first reference voltage to determine whether the cell is overvoltage;

a cutoff signal output step for outputting a cutoff signal for cutting off an inflow of a charge current, when the at least one cell is determined to be in overvoltage in the first overvoltage determination step;

a second voltage measurement step for measuring a voltage of the at least one cell which has been determined to be in overvoltage in the first overvoltage determination step;

a second overvoltage determination step for comparing a second measurement voltage value of at least one cell measured in the second voltage measurement step with a prescribed second reference voltage value to determine whether the cell is in overvoltage;

a balancing FET turn-on signal output step for outputting a turn-on signal to the balancing FET, when the at least one cell is determined to be in overvoltage in the second overvoltage determination step; and an overvoltage discharge step in which a voltage of the at least one cell is discharged, the at least one cell having been determined to be in overvoltage in the second overvoltage determination step, wherein the second reference voltage value is greater than the first reference voltage value.

5. The method of claim 4, wherein in the overvoltage discharge step, the voltage of the at least one cell is discharged in a balancing resistor through the balancing FET.

6. A system for preventing overvoltage of a battery in which one or more cells are provided, the system comprising:

a voltage measurement unit configured to measure a voltage of each cell;

a first control unit configured to output a cutoff signal for cutting an inflow of a charge current, when a first measurement voltage value of at least one cell of the one or more cells measured by the voltage measurement unit is equal to or greater than a prescribed first reference voltage value;

a cutoff unit configured to receive the cutoff signal from the first control unit to cut off the inflow of the charge current;

a cell balancing unit configured to compare a voltage difference between each of the cells to perform cell balancing; and a second control unit configured to compare a second measurement voltage value of the at least one cell measured by the voltage measurement unit with a prescribed second reference voltage value to control the cell balancing unit on a basis of a comparison result, wherein the cell balancing unit comprises:
    a balancing Field Effect Transistor (FET) configured to be on/off-controlled according to a control from the second control unit; and
    a balancing resistor in which a cell current is discharged by the balancing FET being turned on, wherein the second control unit comprises:
    a voltage comparison unit configured to compare the second measurement voltage value measured by the voltage measurement unit with a prescribed second reference voltage value; and
    an overvoltage determination unit configured to output a turn-on signal to the balancing FET, when the second measurement voltage value is equal to or greater than the prescribed second reference voltage value according to a comparison result of the voltage comparison unit, and wherein the balancing FET is configured to discharge a corresponding voltage of the second measurement voltage value of the at least one cell and the balancing resistor is configured to consume the discharged voltage.

* * * * *